No. 621,565. Patented Mar. 21, 1899.
M. L. HARRIS.
FORCEPS.
(Application filed July 14, 1898.)
(No Model.)
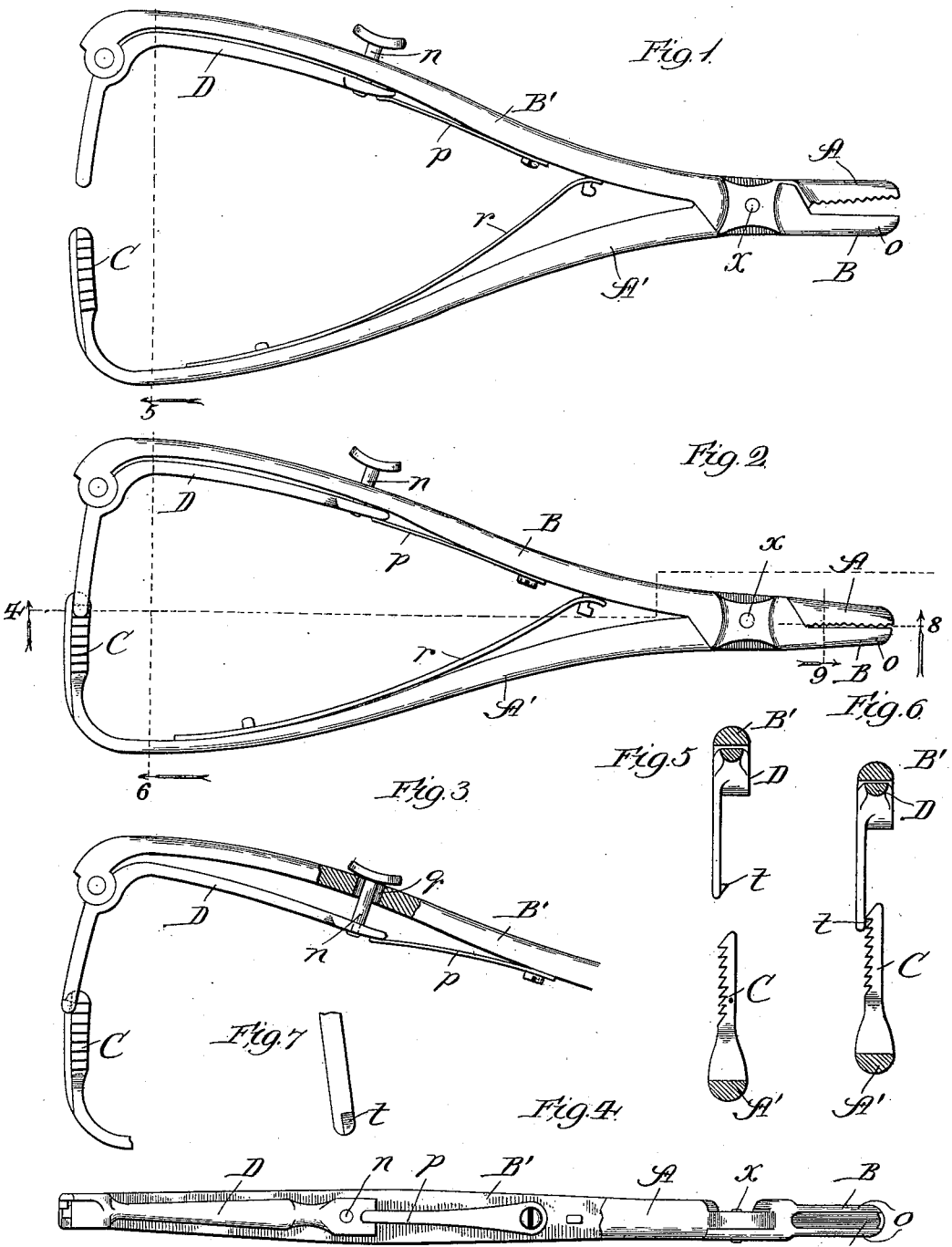

UNITED STATES PATENT OFFICE.

MALCOLM L. HARRIS, OF CHICAGO, ILLINOIS.

FORCEPS.

SPECIFICATION forming part of Letters Patent No. 621,565, dated March 21, 1899.

Application filed July 14, 1898. Serial No. 685,923. (No model.)

*To all whom it may concern:*

Be it known that I, MALCOLM L. HARRIS, a citizen of the United States, residing at Chicago, in the county of Cook and State of Illinois, have invented new and useful Improvements in Needle-Holders, of which the following is a specification.

One feature of my invention relates to the construction of means for fastening the handles together in the gripping condition of the jaws and for readily releasing the handles to permit the jaws to separate.

The other feature of my invention relates to an improved construction of the jaws to adapt them to hold the needle without tendency to break it, particularly when it is of the curved variety, and to adapt them to so firmly grip the curved needle as to prevent it from being turned on its bearing-points between the jaws.

Referring to the accompanying drawings, Figure 1 shows my improved needle-holder, by a view in elevation, with the jaws and handles spread apart or in their normal condition. Fig. 2 is a similar view of the same with the jaws closed and locked by the mechanism provided for the purpose on the handles; Fig. 3, a broken and partly-sectional view of one of the handles, showing the manner of disengaging the locking-dog from the rack; Fig. 4, an inner face view of the jaw-equipped handle carrying the spring-controlled locking-dog, the same being a section taken at the line 4 on Fig. 2 and viewed in the direction of the arrow; Fig. 5, a section taken at the line 5 on Fig. 1 and viewed in the direction of the arrow; Fig. 6, a section taken at the line 6 on Fig. 2 and viewed in the direction of the arrow; Fig. 7, a broken view showing the face of the dog formed by the shorter arm of a bell-crank lever; Fig. 8, a section taken at the line 8 on Fig. 2, viewed in the direction of the arrow and enlarged; and Fig. 9, a section taken at the line 9 on Fig. 2, viewed in the direction of the arrow and enlarged.

A and B are the jaws, respectively, on the handles A' and B', fulcrumed at $x$ and being afforded a tendency to spread apart by the force of an interposed spring $r$. From an end of the handle A' there extends at, or approximately at, a right angle to it a rack C. On the corresponding end of the handle B' there is fulcrumed at its angle a bell-crank lever D, the shorter arm of which projects toward the rack and is provided near its extremity with a tooth $t$ to form of it a dog, and the longer arm being held by a spring $p$ on the handle B' and carrying near its extremity a headed stud $n$, which passes through an opening $q$ in that handle.

When the handles have been compressed together sufficiently far to engage the tooth of the dog with any tooth of the rack C, pressure of a finger of the hand in which the device is held against the head of the stud $n$ turns the bell-crank D on its fulcrum, thereby turning the shorter arm of the bell-crank outward or laterally with relation to the rack and releasing the dog from the rack-tooth with which it is in engagement. Thus the handles are freed to be spread by the action of the spring $r$ and open the jaws, and on releasing the pressure of the finger from the head of the stud $n$ the spring $p$ returns the bell-crank to its normal position, wherein the shorter dog-arm is in alinement with the rack to be again engaged with it for locking the forceps on compressing the handles.

As shown, the jaw B is longitudinally bifurcated and the prongs $o$ $o$ are slightly beveled on their outer surfaces in an inward direction, as shown at $v$ $v$. The jaw A is hollowed out longitudinally or concave in its face to afford a depression, the opposite edges of which should be serrated, as shown, or roughened and slightly flared or beveled outwardly along their inner sides to render the jaw A somewhat wider than the jaw B along its beveled edges.

When a curved surgical needle (not shown) of the ordinary or any kind is inserted between the jaws crosswise thereof and they are brought together against it to grip it, the pressure causes the prongs $o$ of the jaw B to be more or less converged toward the center of the needle between its bearing-points on the edges of the jaw A, and the bevels on the two jaws respectively correspond more or less approximately to the convex and concave sides of the curved needle. Thus the pressure of the jaws against the needle is exerted, as it were, in a radial manner and avoids any tendency to straighten, and accordingly to break the needle. Moreover, the provision of the outside bearing-points of the jaw A and of the inside bearing-points of the jaw B against the needle produces a grip upon it which conforms to its curve and prevents turning of the needle between the jaws when in use.

As will be observed, while the rack and dog are normally in longitudinal alinement with each other, whereby they engage lengthwise of the series of rack-teeth in compressing the handles, the dog is fulcrumed to turn crosswise of the face of the rack. This is an important feature of my improvement, since thereby the dog may by turning it on its fulcrum be disengaged from any rack-tooth by sliding it lengthwise thereof, thus against much less resistance from the spring compressed between the handles than if it were pivoted to swing back and forth with relation to the face of the rack.

It may be suggested that while my improved jaw construction is more especially designed for holding in a forceps the curved variety of surgical needle it serves also for holding equally well a straight needle.

What I claim as new, and desire to secure by Letters Patent, is—

1. In a needle-holder, the combination with the pivotal spring-pressed handles, of a rack forming the inward projecting termination of one handle, a bell-crank lever pivoted at its angle to the end of the other handle with its shorter arm, forming a dog, projecting toward said rack to engage therewith, and the longer arm extending along the inner face of the adjacent handle, a spring confined against said longer arm, and a stud confined in an opening in the handle carrying said bell-crank to bear against said longer arm, substantially as described.

2. In a needle-holder, the combination of a hollow-faced serrated-edged jaw and a straight-edged jaw coöperating therewith of dimensions adapting it to enter within said hollow-faced jaw, substantially as and for the purpose set forth.

3. In a needle-holder, the combination of a hollow-faced serrated-edged jaw and a narrower bifurcated straight-edged jaw coöperating therewith, substantially as and for the purpose set forth.

4. In a needle-holder, the combination of a hollow-faced jaw serrated along its edges, and a narrower bifurcated jaw coöperating therewith, substantially as and for the purpose set forth.

5. In a needle-holder, the combination of a hollow-faced jaw having beveled sides, and a bifurcated jaw coöperating therewith and having its prongs beveled to coöperate with said hollow-faced jaw, substantially as and for the purpose set forth.

MALCOLM L. HARRIS.

In presence of—
M. J. FROST,
R. T. SPENCER.